Oct. 5, 1971  A. H. BELLOWS  3,610,123
COLLAPSIBLE CAMERA WITH COLLAPSIBLE VIEWFINDER
Filed July 1, 1969

INVENTOR.
ALFRED H. BELLOWS
BY
Brown and Mikulka
and
Frederick H. Brustman
ATTORNEYS

United States Patent Office 3,610,123
Patented Oct. 5, 1971

3,610,123
COLLAPSIBLE CAMERA WITH COLLAPSIBLE VIEWFINDER
Alfred H. Bellows, Cambridge, Mass., assignor to Polaroid Corporation, Cambridge, Mass.
Filed July 1, 1969, Ser. No. 838,196
Int. Cl. G03b 13/02
U.S. Cl. 95—11 V                                16 Claims

ABSTRACT OF THE DISCLOSURE

A collapsible, self-erecting optical assembly including a rangefinder and a viewfinder. A selected shape imparted to a telescoping member prevents it from binding or jamming during movement. Precise alignment is achieved automatically on erection. Springs erect the optical assembly when restraining forces are removed.

BACKGROUND OF THE INVENTION

The present invention is concerned with optical devices for use with photographic cameras. Specifically, it is concerned with rangefinders, viewfinders, and like instruments mounted in collapsible, self-erecting, housings. Such collapsible self-erecting optical instruments are particularly suitable for use with compact folding cameras of the self-developing type. A premium is put on compactness in photographic cameras, particularly when the cameras are intended to be conveniently carried about on the person. In self-developing cameras, limitations imposed by format size make it difficult to build a very compact unit, more so than with standard cameras. Compact packaging or mounting of the optical instruments for use with such a camera is desirable especially when the camera is not in use and is folded for storage or carrying. These instruments should be constructed so they assume minimum size as an unattended incident of folding a compact self-developing camera for storage. A desirable feature for the collapsible instruments is the provision of automatic self-erection resulting from unfolding the camera for use.

Maintaining a high degree of accuracy in the spacing and alignment of the optical components in self-erecting instruments is very important. Errors can cause mistakes in focusing the associated folding camera or in composing a picture. Optical instruments such as a viewfinder and the like must meet certain design conditions to function properly. There should be no possibility for lateral misalignment when the viewfinder is erected. Lateral misalignment, if permitted, causes the frame image to shift correspondingly. As a consequence, the photographer is unable to compose his picture as desired. It is possible that part of the subject might not be recorded if the misalignment is excessive.

Another requirement imposed on a viewfinder in order that it function properly is that separation between the front and rear elements be the same each time the viewfinder is erected. This is particularly important in the Albada type viewfinder. If the separation varies, the apparent location of the reticle image changes. This condition can make it difficult for the photographer to focus his eye on both the frame and his subject simultaneously. In consequence, it becomes difficult to use the viewfinder. Another problem caused by variation in separation between the optical elements is an apparent change in frame size. Apparent changes in frame size, caused by improper separation of the optical elements, can deceive the photographer as to how much of his subject can be recorded on the film format. Insufficient separation of the optical elements can be caused by binding or jamming of an erectable component. Such binding can be caused by a lack of clearance between the moving component and the opening through which it passes. A precise fit is required at full erection, to prevent misalignment.

Jamming of a moving component in its opening is usually caused by its twisting, cocking or rotating slightly as it moves. When a moving or sliding element twists, its cross-section with respect to its proper orientation increases. If it twists enough, no clearance for movement remains. Binding or jamming can take place. Normal engineering practice to prevent this suggests a long depth of engagement, perhaps one or two times a major cross-sectional dimension. An alternative is a very loose fit. The former is detrimental to the desirable compactness, the latter to maintaining precision alignment between erect optical instrument components.

The compactness required of the self-erecting optical instrument housing dictates that a solution to the non-jamming requirement cannot add to the external erected volume or the compact volume. Combining several optical instruments inside the housing means that internal space cannot be sacrificed merely to insure alignment and spacing arrangements.

SUMMARY OF THE INVENTION

A self-erecting housing for photographic optical systems such as rangefinders and viewfinders is disclosed herein. It is characterized in having a telescoping member which extends through an opening in the housing or receiving member. At least part of the optical system is mounted on and moves with the telescoping member. Springs push the telescoping member out through the the opening to erect the optical system. Flanges, which can be integral with the telescoping member, insure that the proper optical spacing is never exceeded when the optical system is erected for use. A precise fit between the opening in the telescoping member when it is in the erected configuration controls the alignment of the optical system within necessarily precise tolerances.

Insufficient separation of the optical elements due to jamming or binding of the telescoping member is eliminated by a special configuration imparted to it. Even though a precise fit is achieved at full erection, no jamming results because of the special configuration. Erecting and collapsing of the optical system is accomplished as an unattended incident to opening or closing an associated compact folding camera. Springs within the housing automatically erect its optical systems when restraining forces are removed, as by unfolding the camera.

An object of this invention is to provide non-jamming collapsible optical system and housing.

Another object of this invention is the provision of a non-jamming self-erecting optical system housing.

Yet another object of this invention is a non-binding, jam proof self-erecting telescoping rangefinder-viewfinder wherein a telescoping member is precisely fitted when erected; sides of the telescoping member are shaped such that it cannot cause jamming within the opening through which it moves.

Other objects of the invention will in part be obvious and in part appear hereinafter.

The invention accordingly comprises the apparatus possessing the construction, combination of elements and arrangements of parts which are exemplified in the following detailed disclosure and the scope of the application of which will be indicated in the claims.

DESCRIPTION OF THE DRAWINGS

For a fuller understanding of the nature and objects of this invention, reference should be made to the following detailed description, taken in connection with the accompanying drawing wherein.

DESCRIPTION OF THE PREFERRED EMBODIMENT

Figure 1:
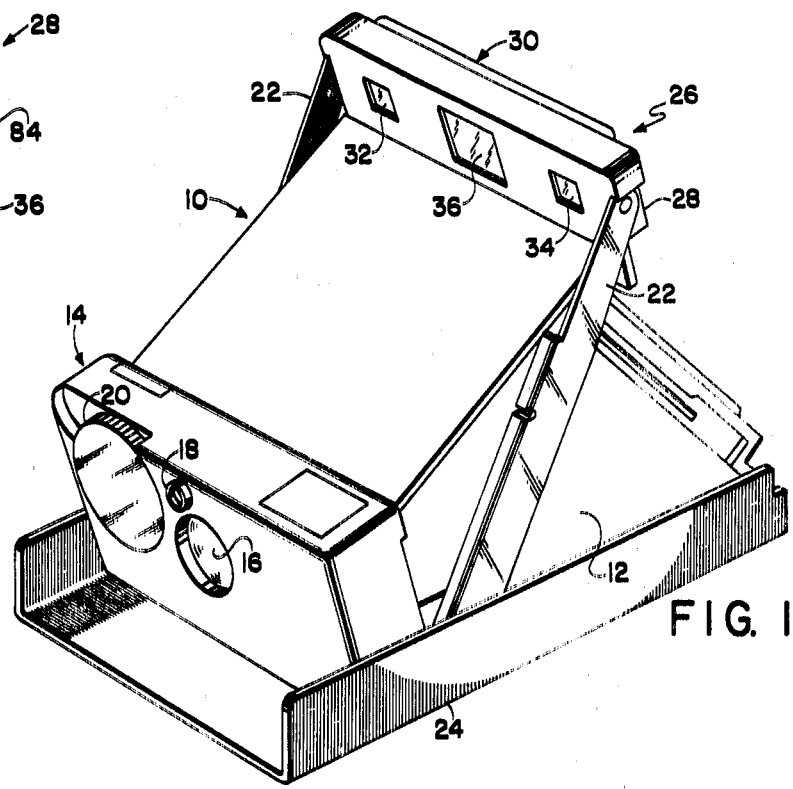
FIG. 1 illustrates the non-jamming self-erecting optical assembly housing mounted on a folding photographic camera.

Reference is now made to FIG. 1. Illustrated in FIG. 1 is a view of a compact folding camera 10 erected for use. A camera of this type is shown and fully described in copending U.S. Pat. application by Edwin H. Land et al., Ser. No. 655,850, filed July 25, 1967. Folding camera 10 comprises several elements and subsystems. These are arranged about a central exposing chamber 12. A front section 14 contains a lens 16, an electric eye 18, for exposure control, and a focusing knob 20 to set lens 16. Front section 14 also includes a shutter mechanism and other devices which are not shown. Supporting members 22 can be locked to keep the camera 10 erected for use. A cassette containing photographic materials and processing chemicals (not shown) nests inside base member 24 and within exposing chamber 12. At the top of camera 10 is an optical assembly 26. A housing or receiving member 28 and a telescoping member 30 are the principal components of assembly 26. Telescoping member 30 can move between extended and retracted positions through an opening in the rear of housing or receiving member 28. These two positions of telescoping member 30 relative to housing member 28 represent the compact form and the erect ready-for-use form of assembly 26. Windows 32 and 34 in housing member 28 are used for a coincidence rangefinder, described later herein. Window 36 is the front element of a viewfinder.

Figure 2:
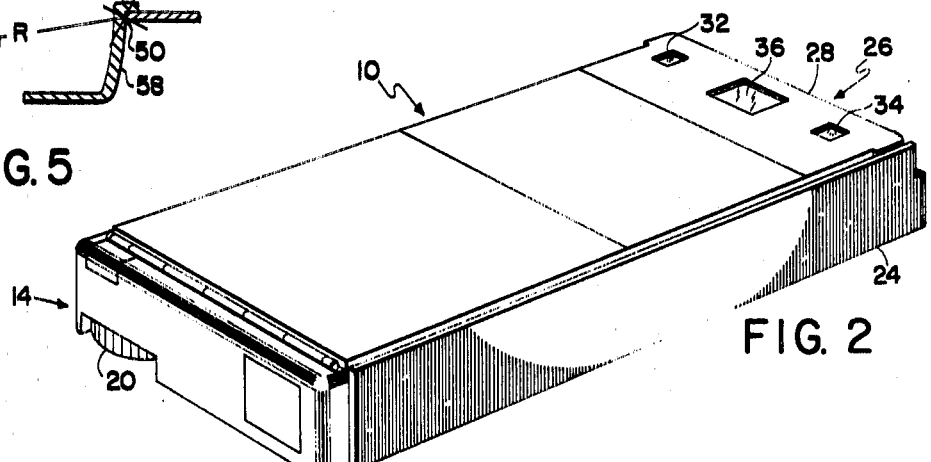
FIG. 2 illustrates the compactness of the folded camera and its optical assembly housing.

Reference is now made to FIG. 2 showing the compactness of camera 10 in its folded storage configuration. Comparison between FIGS. 1 and 2 readily indicates the considerable difference in volumetric size between the two configurations of folding camera 10. All of the operational systems and related implements mounted on the camera fold into base member 24. Front section 14 folds down in such a manner that the objective lens 16 and electric eye 18 are protected from damage while in storage. Optical accessory case 26 containing both a rangefinder and a viewfinder also folds down into base member 24. As optical assembly 26 nests into base 24, pressure from base member 24 causes telescoping member 30 to move back or retract into housing 28 through its rear opening. This action considerably reduces the storage volume available for the optical systems within assembly 26.

Figure 4:
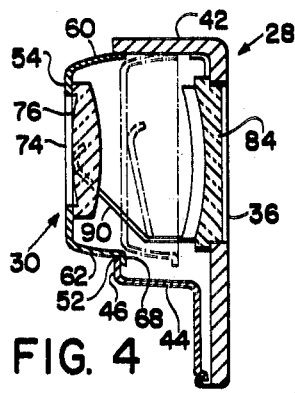
FIG. 4 illustrates another cross-section taken through the viewfinder showing the shape of the telescoping member's peripheral surfaces.
Figure 3:
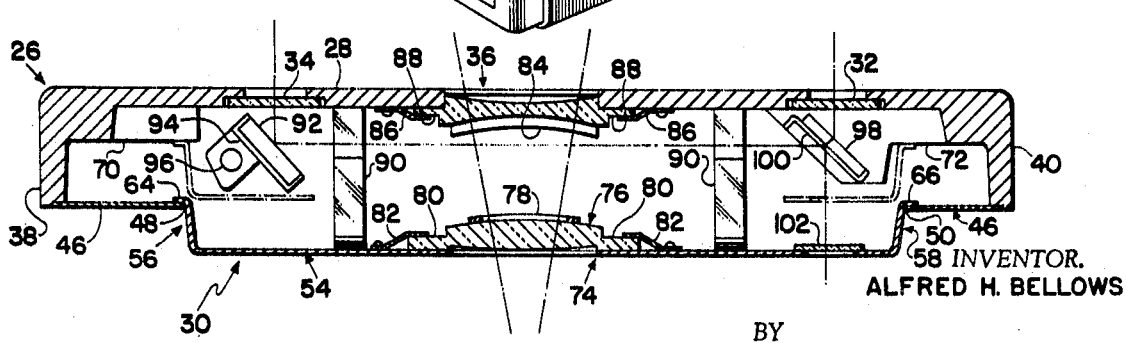
FIG. 3 illustrates a cross-sectional view of the self-erecting optical assembly of this invention.

Referring to FIGS. 3 and 4, the internal arrangement of the optical elements and some other parts required for the viewfinder and rangefinder to function properly are depicted. Principal elements of the optical assembly 26 are housing or receiving member 28 and telescoping member 30. Housing 28 has sides 38, 40, 42 and 44. Attached to sides 38, 40, 42, and 44 is rear wall 46 having an opening therein bounded by edges 48, 50 and 52. Edges 48, 50, 52 and side 42 define a rectangular opening of given transverse dimensions in housing member 28 through which telescoping member 30 passes. Telescoping member 30 is formed having rear surface 54 and longitudinally disposed peripheral surfaces 56, 58, 60 and 62. Those peripheral side walls are arranged to define a rectangular cross-section similar to the rectangular opening in rear wall 46. This cross-section progressively enlarges from rear surface 54 when taken linearly along the axis of member 30.

Flanges 64, 66 and 68 are attached to peripheral surfaces 56, 58 and 62 to insure that telescoping member 30 is not moved beyond its predetermined extended position. Stops 70 and 72, formed inside the front wall of the housing member 28, insure that telescoping member 30 does not retract into housing member 28 beyond a predetermined retracted position.

One or more springs 90 urge telescoping member 30 through the opening in rear wall 46 towards its extended position. Telescoping member 30 is returned into housing member 28 by the forces generated upon folding camera 10 when closed for storage. These forces overcome the resistance of springs 90. Because jamming is an impossibility due to the special shape imparted to the peripheral surfaces of telescoping member 30, springs 90 can be weak. They are not required to be strong enough to overcome binding or jamming forces.

From FIGS. 3 and 4 one can appreciate the large number of components which must be enclosed within the collapsible case 26. These include all the elements for a coincidence rangefinger, an Albada viewfinder, the automatic erecting system and certain other components for adjusting the rangefinder which are not shown. Because of the great number of components fitted inside this automatically erecting optical accessory case, it is important that telescoping member 30 have the greatest internal volume possible so it can clear the optical components when it is collapsed into housing member 28 for storage. It is also to be appreciated that alignment of telescoping member 30 with respect to housing member 28 is critical when the optical accessory case 26 is erected for use. Functional accuracy of the erected optical systems is predicated on such an accurate alignment.

Figure 5:
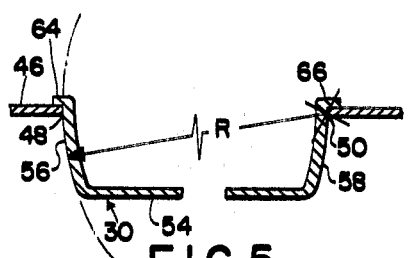
FIG. 5 is a cross-sectional representation of the telescoping member taken through the telescoping member and depicting it in an extended orientation.

The peripheral surfaces of telescoping member 30 are selectively shaped to assure that it cannot bind or jam during erection. In addition, they must function as a means of reliably aligning the components after erection of optical assembly 26. This is accomplished without the presence of loose fits between moving parts, wasting of internal volume, or space consuming long lengths of engagement between sliding members. When telescoping member 30 is in its extended position, peripheral surfaces 56, 58, 60 and 62 conform precisely to the configuration and dimensions of the opening in rear wall 46 which is defined by edges 64, 66, 68 and side wall 42. It is this precise fit which insures perfect optical alignment and spacing of the components for the internal optical systems. Despite this precise fit, the chance of binding is nil because of the peripheral surface's shape. Referring to FIG. 5, a detail showing the shape of peripheral surfaces 56 and 58 and the precise engagement of telescoping member 30 within the opening in rear wall 46 is provided. Peripheral surfaces 56 and 58 guide telescoping member 30 through the opening in rear wall 46. When telescoping member 30 reaches a predetermined extension, they contact edges 48 and 50 of that opening. No loose clearance remains. Thus, lateral alignment is certain. Flanges 64 and 66 insure that telescoping member 30 does not move beyond its predetermined extended position.

Attention is directed to the selectively curved peripheral surfaces of telescoping member 30. As seen in FIG. 5, this surface is formed having a radius R. Radius R is equal to the distance across the opening in rear wall 46 in a direction normal to surface 56. If telescoping member 30 should be tilted during extending movement, for example, about edge 50, it cannot jam within the opening. This is so because the distance across telescoping member 30 in this direction never exceeds the parallel dimension of the opening. Each peripheral surface of telescoping member 30 is curved with the appropriate radius for that surface. Obviously other orientations can be assumed by telescoping member 30 as it moves through the opening. It cannot jam or bind in any orientation. Even so, volume is not wasted and at erection very close tolerances are maintained. When telescoping member 30 is in its retracted position and moving outwardly towards its predetermined extended position, curved peripheral surfaces 56 and 58 act to guide the telescoping member through the opening in rear wall 46. When telescoping member 30 is in its predetermined extended position, there is no significant clearance between peripheral surfaces 56, 58, 60, 62 and edges 48, 50, 52 and side wall 42 of the opening in rear wall 46. This close fit insures proper alignment of the optical subsystems within optical assembly 26. In addition to a curved surface, a peripheral surface shaped in the form of one or more chords of an arc having the described radius R will also perform satisfactorily. Using a chord, instead of a radius, reduces the internal volume of telescoping member 30. Using a dimension for this radius less than the specified dimension R results in a telescoping member 30 which has excess freedom of movement within the opening in rear wall 46 when in its extended position. Internal space is thereby sacrificed. Alignment of the optical subsystems within assembly 26 becomes unreliable.

Returning to FIGS. 3 and 4, internal optical components comprising the rangefinder and viewfinder are illustrated. A window 74 in telescoping member 30 is located opposite window 36 in housing member 28. An optical element 76, part of an Albada viewfinder, is located in window 74. A reticle 78 is on the forward surface of optical element 76. Clips 82 bear on tabs 80 which are an integral part of optical element 76. This keeps optical element 76 in place in window 74. A front element 84 of the Albada viewfinder is held in window 36 by clips 86 bearing on tabs 88 which are an integral part of front element 84. Front element 84 of the Albada viewfinder has a semi-transparent mirror on its concave rear surface.

A coincident image rangefinder is also located in the self-erecting case. It is composed of two mirrors. A first mirror 92 is mounted in bracket 94 opposite window 34 to rotate about pivot 96. Mirror 92 reflects an image passing through window 34 along the length of receiving member 28 to a semi-transparent mirror 98 mounted in stationary bracket 100. Semi-transparent mirror 98 reflects the image from mirror 92 rearwardly through window 102 in telescoping member 30. Mirror 98 also transmits an image entering window 32 through window 102. Ranging is accomplished by the observer manipulating a control (not shown) to rotate mirror 92 until the images from windows 32 and 34 are superimposed. Mechanisms for coupling the adjustment of the rangefinder with the focal setting of the objective lens 16 are well known.

Part of the internal volume of optical assembly 26 is shared by the rangefinder and viewfinder. This aids its compactness. There are many parts inside assembly 26, some not shown, therefore it must have maximum internal volume.

A very precise fit exists between the maximum dimensions of the peripheral surfaces of telescoping member 30, carrying rear element 76 of the viewfinder, and the opening through which it passes in rear wall 46 defined by edges 48, 50, 52 and side wall 42. Thus, when telescoping member 30 is at its extended position, lateral misalignment of the viewfinder elements 76 and 84 is impossible. Flanges 64, 66 and 68 insure that telescoping member 30 does not carry optical element 76 beyond its intended location. The selected shape of the peripheral surfaces of telescoping member 30 insures that it will not bind or jam in the opening. Thus, the spacing between elements 76 and 84 is always correct.

Phantom lines in both FIGS. 3 and 4 show the position of telescoping member 30 and springs 90 when self-erecting optical accessory case 26 is collapsed for storage. It can be seen, particularly in FIG. 3, how sufficient space remains for all the optical elements which must be fitted into the case.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A viewfinder for a foldable photographic camera comprising:
   a housing member having an opening of rectangular configuration with a given transverse dimension;
   a telescoping member having peripheral sidewalls movable between retracted and extended portions through said opening, said peripheral sidewalls having a longitudinal contour with a curvature of radius equal to said given dimension, presenting a progressively larger cross-section across said opening when moved linearly therethrough from said retracted portion, said cross-section being dimensioned to substantially correspond with the dimension of said opening when said member is in said extended position;
   biasing means for urging said telescoping member to move from said retracted to said extended position; and
   optical means having one element mounted upon and movable with said telescoping member and another element mounted upon said housing member for forming the optical system of said viewfinder when said telescoping member is in said extended position.

2. A collapsible optical assembly comprising:
   a receiving member having an opening of select configuration with given transverse dimension;
   a telescoping member having a peripheral surface movable between retracted and extended positions through said opening, said peripheral surface having a longitudinal contour with a curvature of radius not exceeding said given dimension and presenting a progressively larger cross-section to permit unrestricted tilting across said opening when moved linearly therethrough from said retracted position during said movement of said telescoping member through said opening; and
   optical means having one element mounted upon and movable with said telescoping member and another element mounted upon said receiving member for forming an optical system when said telescoping member is in said extended position.

3. The optical assembly of claim 2 including means for restraining said movement of said telescoping member at said extended position; and
   wherein said peripheral surface is shaped to substantially conform to said configuration of said opening when said telescoping member is in said extended position.

4. The optical assembly of claim 3 in which said movement restraining means comprises a flange formed about an edge of said peripheral surface and abuttable against a surface of said receiving member when said telescoping member is in said extended position.

5. The optical assembly of claim 4 wherein the said longitudinally disposed peripheral surface has curvature formed of a radius having its center on an edge of said opening, opposite said peripheral surface.

6. The optical assembly of claim 4, wherein said peripheral surface of said telescoping member is configured, at its junction with said flange, to substantially correspond with said configuration of said opening.

7. The optical assembly of claim 6 including biasing means for urging said telescoping member to move through said opening toward said extended position.

8. The optical assembly of claim 7 wherein said opening is configured as a rectangle; and
   said peripheral surface of said telescoping member is arranged having a corresponding rectangular cross-sectional configuration.

9. The optical assembly of claim 8 wherein said rectangular opening is configured having select width and length;
   said peripheral surface, where it is parallel to said width, has a curvature of radius equal to said length; and said peripheral surface, where it is parallel to said length, has a curvature of radius equal to said width.

10. A collapsible optical assembly for photographic apparatus comprising:
- a housing member having an opening of select configuration with a given transverse dimension;
- a telescoping member having a peripheral surface slidably movable between retracted and extended positions through said opening, said peripheral surface having a longitudinal contour to conform within a boundary defined by a curvature of radius equal to said given dimension and presenting a progressively larger cross-section across said opening when moved linearly therethrough from said retracted position to permit unrestricted tilting during said slidable movement of said telescoping member through said opening;
- optical means formed with at least said telescoping member for forming an optical system when said telescoping member is in said extended position; and
- means for restraining said movement of said telescoping member at said extended position.

11. The optical assembly of claim 10 wherein the said cross-section of said peripheral surface is shaped to substantially conform and closely fit within said configuration of said opening when said telescoping member is in said extended position.

12. The optical assembly of claim 11 in which said movement restraining means comprises a flange formed about an edge of said peripheral surface and abuttable against a surface of said housing member when said telescoping member is in said extended position.

13. The optical assembly of claim 12 including biasing means for urging said telescoping member to move through said opening toward said extended position.

14. A collapsible optical viewing assembly for foldable photographic camera comprising:
- a housing member mountable upon said camera having an opening of select configuration with a given transverse dimension;
- a telescoping member having peripheral sidewalls slidably movable between retracted and extended positions through said opening and nestable substantially within said housing member when in said retracted position, said sidewalls having a longitudinal contour with a curvature of radius equal to said given dimension, presenting a progressively larger cross-section across said opening when moved linearly therethrough from said retracted position and fitting closely within said opening when said telescoping member is in said extended position;
- means for restraining the outward movement of said telescoping member at said extended position; and
- means for forming an optical path through said telescoping member and said housing member.

15. The optical viewing assembly of claim 14 in which said movement restraining means comprises a flange formed about an edge of said sidewalls and abuttable against an interior surface of said housing member when said telescoping member is in said extended position.

16. The optical viewing assembly of claim 15 including spring means mounted intermediate said housing member and said telescoping member for urging said telescoping member to move through said opening toward said extended position.

References Cited

UNITED STATES PATENTS

| 1,114,895 | 10/1914 | Linder | 88—1.5 NR |

FOREIGN PATENTS

| 63,204 | 8/1891 | Germany | 350—70 |
| 8,324 | 7/1902 | Germany | 350—70 |
| 318,229 | 1/1920 | Germany | 95—39 |
| 728,741 | 4/1955 | Great Britain | 95—42 |

SAMUEL S. MATTHEWS, Primary Examiner

R. P. GREINER, Assistant Examiner

U.S. Cl. X.R.

95—32, 39; 88—1.5 R